US006896454B2

(12) United States Patent
Gerhardt et al.

(10) Patent No.: US 6,896,454 B2
(45) Date of Patent: May 24, 2005

(54) ELECTRIC POWER TOOL

(75) Inventors: Graham Gerhardt, Warrandyte (AU); Harry Szommer, Carrum Downs (AU); Warren Brown, Mt. Evelyn (AU)

(73) Assignee: Hills Industries Limited, Edwardstown (AU)

( * ) Notice: Subject to any disclaimer, the term of this patent is extended or adjusted under 35 U.S.C. 154(b) by 0 days.

(21) Appl. No.: 10/344,427

(22) PCT Filed: Aug. 14, 2001

(86) PCT No.: PCT/AU01/01008

§ 371 (c)(1),
(2), (4) Date: Jul. 22, 2003

(87) PCT Pub. No.: WO02/14035

PCT Pub. Date: Feb. 21, 2002

(65) Prior Publication Data

US 2004/0253068 A1 Dec. 16, 2004

(30) Foreign Application Priority Data

Aug. 14, 2000 (AU) .................................... PQ9407

(51) Int. Cl.[7] ................................................ B23C 1/20
(52) U.S. Cl. .................. 409/182; 409/181; 144/136.95
(58) Field of Search ................................ 409/182, 181, 409/178, 175, 183, 184, 185, 204, 206, 210, 409/214, 218, 186, 187, 188, 193, 194, 195, 409/207, 208, 209; 144/136.95, 154.5, 371; 83/954, 477.2; 200/42.01, 42.02, 43.16, 43.17, 200/43.18, 43.19, 43.2, 43.21, 43.22, 520, 200/522, 293.1, 318, 318.1, 318.2, 332.2; 310/40 R, 50

(56) References Cited

U.S. PATENT DOCUMENTS

| | | | | |
|---|---|---|---|---|
| 1,611,381 A | * | 12/1926 | Salsbury | 409/182 |
| 3,908,510 A | | 9/1975 | Koskolos et al. | |
| 4,885,436 A | * | 12/1989 | Pham et al. | 200/43.16 |
| 5,662,440 A | * | 9/1997 | Kikuchi et al. | 409/182 |
| 5,671,789 A | * | 9/1997 | Stolzer et al. | 409/182 |
| 6,065,912 A | | 5/2000 | Bosten et al. | |
| 6,079,916 A | * | 6/2000 | Grayson et al. | 409/182 |
| 6,558,090 B2 | * | 5/2003 | Lagaly et al. | 409/182 |

FOREIGN PATENT DOCUMENTS

| | | |
|---|---|---|
| CH | 604 995 | 9/1978 |
| DE | 39 12991 A1 | 10/1990 |
| DE | 198 09 897 A1 | 8/1999 |

* cited by examiner

*Primary Examiner*—A. L. Wellington
*Assistant Examiner*—Dana Ross
(74) *Attorney, Agent, or Firm*—Paul & Paul

(57) ABSTRACT

An electric power tool including a housing 2 having a motive power 3, and a tool holder 19 coupled to said motive power 3 for receiving a cutting tool, a base plate 4 having an opening 5 through which said cutting tool extends, said base plate 4 being adjustable mounted to said housing by guide arms 6, 7, the position of said cutting tool being varied by adjusting the position of the base plate 4 relative to the housing 2, said tool holder 19 being able to extend through the opening 5 of the base plate 4 for easier access to the tool holder, a slave pin 24 in the housing 2 adapted to engage a recess in the tool holder to lock the tool holder 19 against rotation to enable single-handed removal of a tool from the tool holder 19 from above a tool table, such as a router table.

19 Claims, 9 Drawing Sheets

ELECTRIC POWER TOOL

Figure 1:
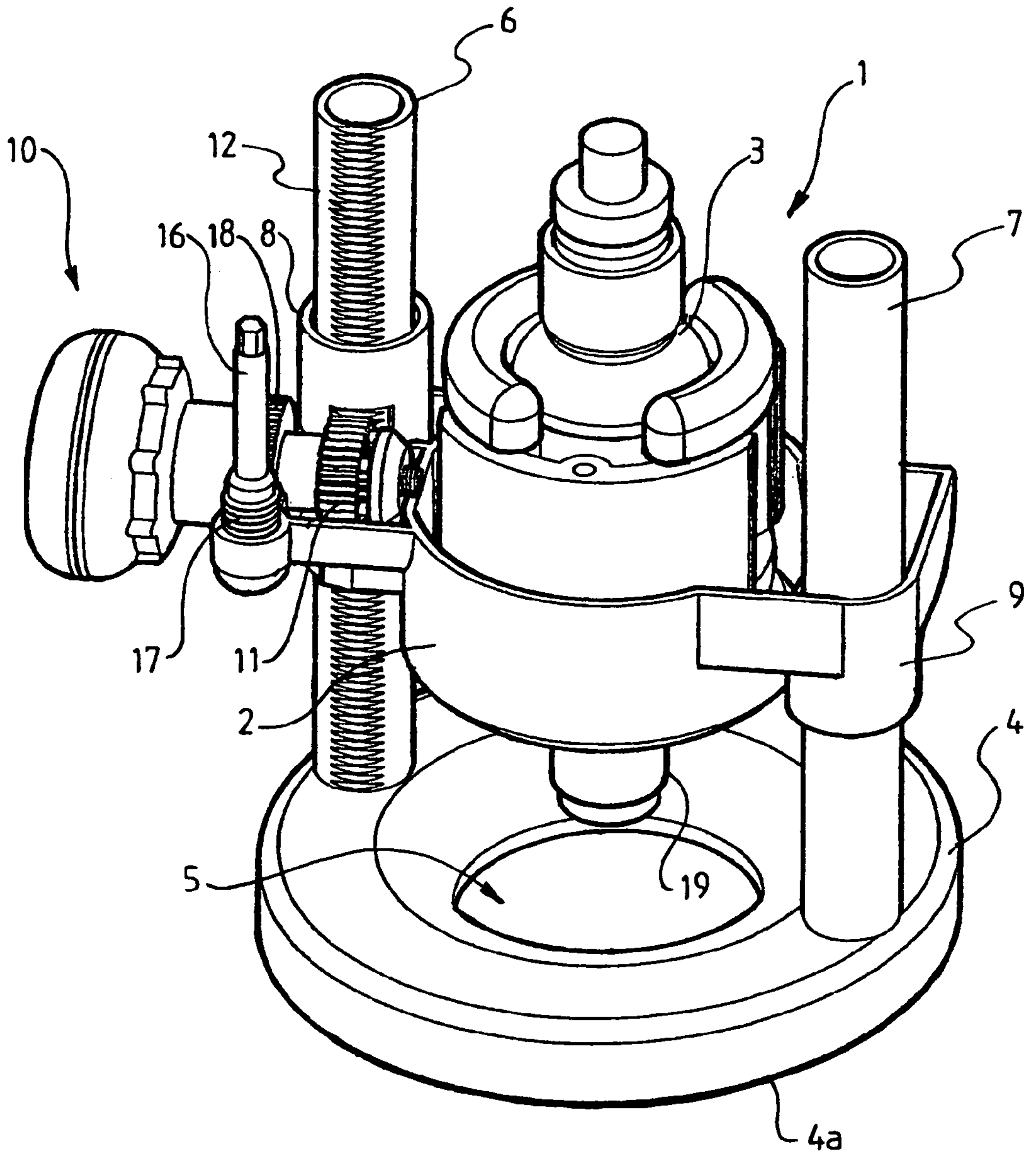

This invention relates to electric power tools which are adapted for under bench operation and particularly to a router for hand held and under bench applications.

Routers are in the category of electric power tools having a motive power within a housing with a tool holder for a cutting tool, in which the motive power for the tool holder and cutting tool are aligned along the longitudinal axis of the cutting tool. A router will generally have a base plate connected to the housing by guide poles with the cutting tool extending through the plate. The tool is held by a tool holder which is difficult to access for tool changing in under bench operation.

As almost all routers are principally designed for hand held use, the tool holder is limited in its movement and is not designed to extend beyond the opening in the base plate.

This limitation introduces a number of problems associated with the operation of these electric power tools. The abovementioned restriction in the movement of the tool holder reduces the ability to change the cutting tool easily. This is a particularly serious limitation if the router is to be used for under bench operation or an over-bench operation where the router is used in conjunction with a guide structure.

Furthermore, as the tool holder is always between the housing and the base plate access to the tool holder is restricted by the guide arms and the base plate. When the cutting tool in the tool holder is to be changed, the tool holder needs to be immobilised by depressing or holding an in built shaft lock or using a key with one hand while it is loosened using a key with the other hand. In any event, the cutting tool changing operation is a two-handed operation which is made more difficult by the limited access to the tool holder.

It is an object of the present invention to provide an electric power tool and particularly a router which overcomes at least one of the above disadvantages.

Accordingly, in one aspect, the invention provides an electric power tool including a housing having a motive power therein, a tool holder coupled to said motive power for receiving a cutting tool and rotating said cutting tool about a longitudinal axis, a base plate having an opening through which said cutting tool extends to engage a work piece, said base plate being adjustably mounted to said housing by guide arms, the extension of said cutting tool being varied by adjusting the position of said base plate relative to said housing, said tool holder being able to extend through the opening in said base plate.

The abovementioned electric power tool, which is preferably a router, is particularly adapted although not restricted to under bench use or for over bench use where the router is placed on a guide mechanism. By enabling the tool holder to extend beyond the opening in the base plate access to the tool holder for tool changing is greatly improved. This is especially beneficial for under bench use of the power tool.

In a preferred form of this aspect of the invention, the tool holder is engageable with said base plate, and disengagement means is provided to disengage the motive power prior to contact of the tool holder with the base plate. The disengagement means is preferably a stop which is activated whenever the motive power is activated. Once the motive power is disengaged, the stop may be deactivated to enable the housing and base plate to be brought sufficiently close together to allow engagement of the tool holder with the base plate.

In accordance with a second aspect of the invention, there is provided an electric power tool including a housing having a motive power therein, a tool holder coupled to said motive power for receiving a cutting tool and rotating said cutting tool about a longitudinal axis of said cutting tool, and a base plate having an opening through which said cutting tool extends to engage a work piece, said base plate having means of engaging said tool holder only when the motive power to the power tool is disengaged or off.

In a preferred form of this aspect of the invention, the power tool includes a safety stop which prevents contact between said tool holder and said base plate while the motive power is engaged. Once the motive power is disengaged and the base plate and tool holder brought into contact, a locating pin preferably provided in the base plate engages with a recess formed in the tool holder. Once engaged, the locating pin immobilises the tool holder and retains the tool holder in position until released.

The motive power to the power tool is preferably activated and deactivated by a switching means including a slide cover and an on/off switch. So that the motive power cannot be accidentally activated once switched off, the slide cover is spring loaded to engage with the switch to retain the switch in the off position. It is held back by the switch, against the spring, when the switch is in the on position.

Guide arms extend between the base plate and the housing to adjustably control the relative position of the base plate to the housing. The guide arms are preferably received within sleeves formed in the housing, the housing being provided with an adjustment means.

The slide cover of the switch means further includes a safety stop which limits the progress of at least one of the guide arms within each respective sleeve of the housing when the slide cover is held back in its retracted position by the switch in the on position. The guide arms are constructed so that the tool holder is not in contact with the base plate when at least one guide arm contacts the safety stop. The slide cover is spring loaded toward the switch and is held back over the plunge posts when the switch is on.

Figure 2:
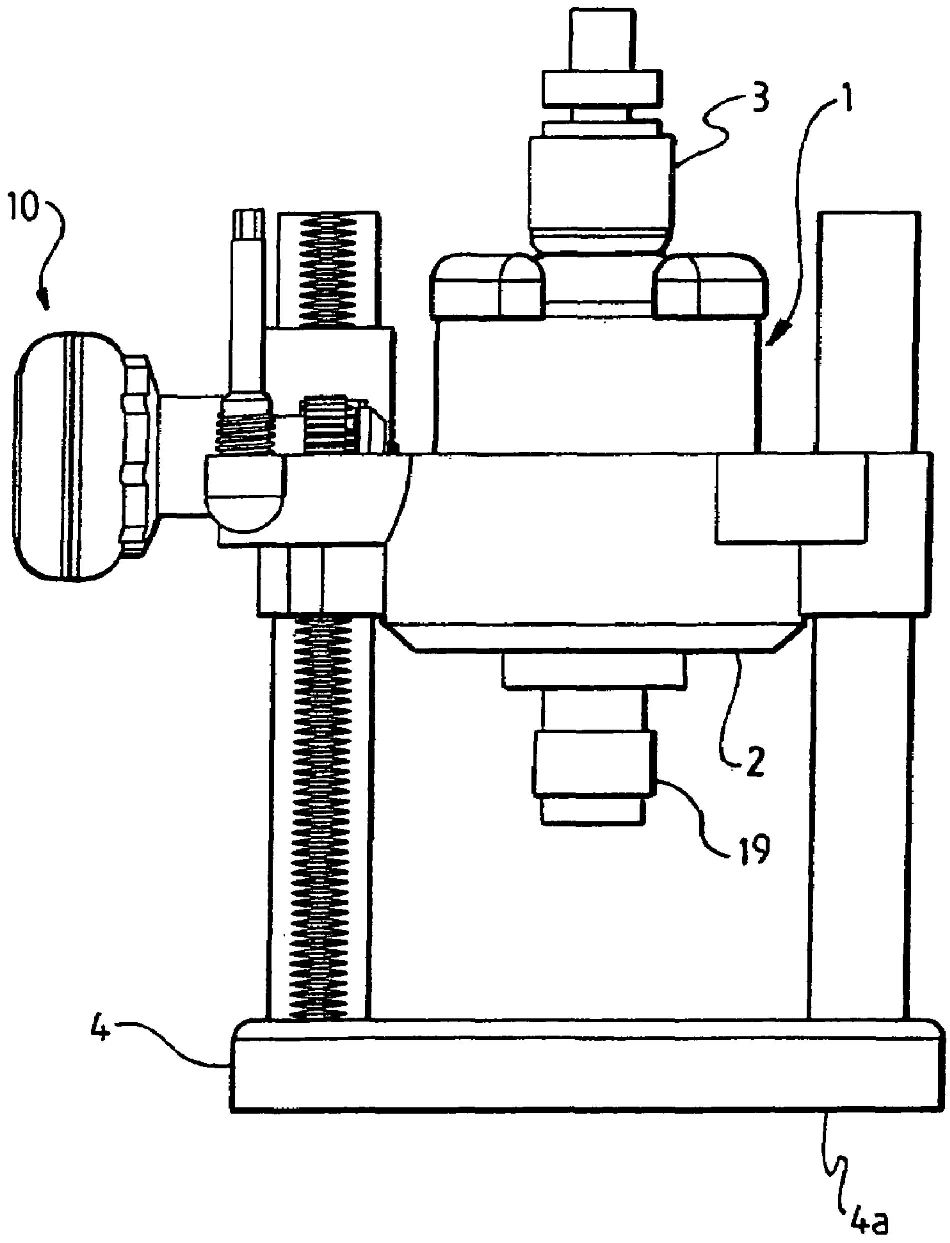
Figure 3:
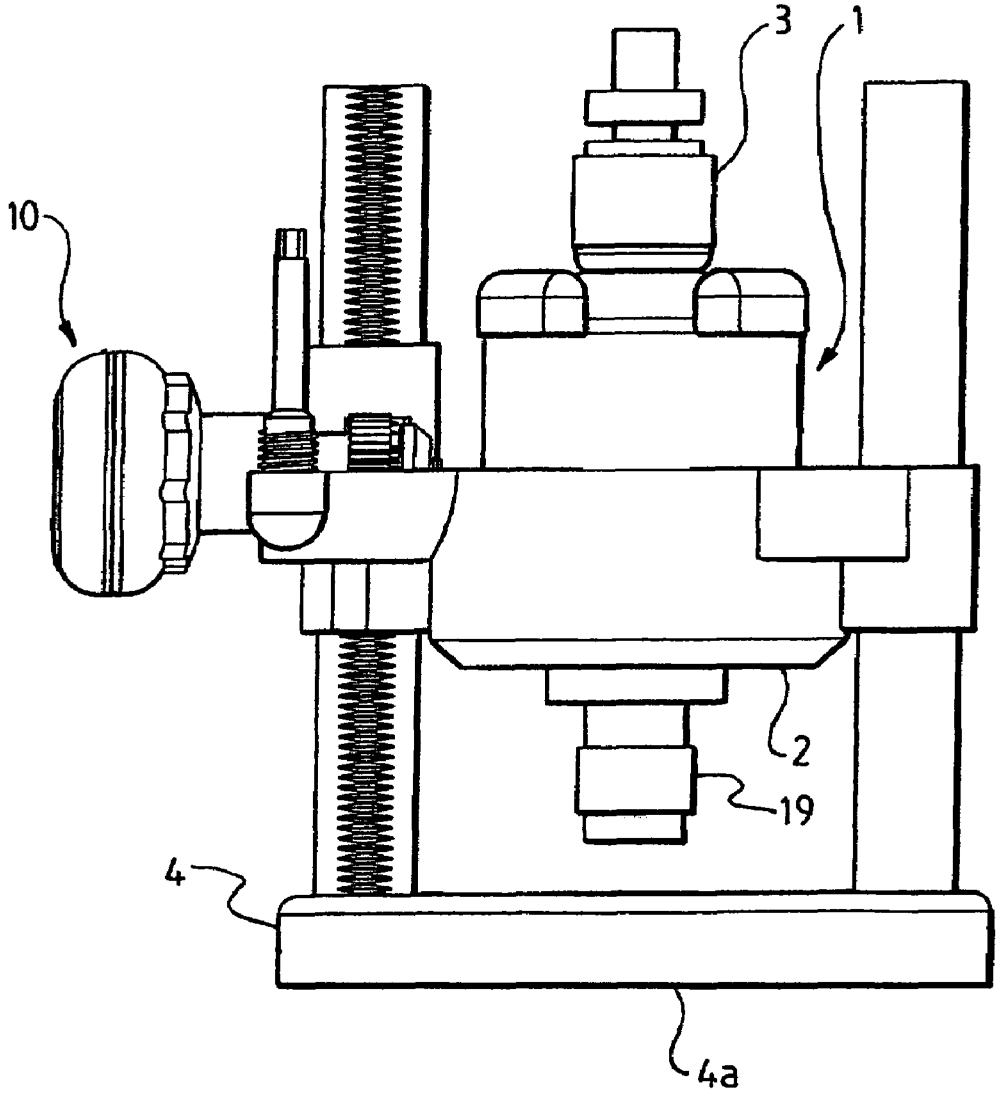
Figure 4:
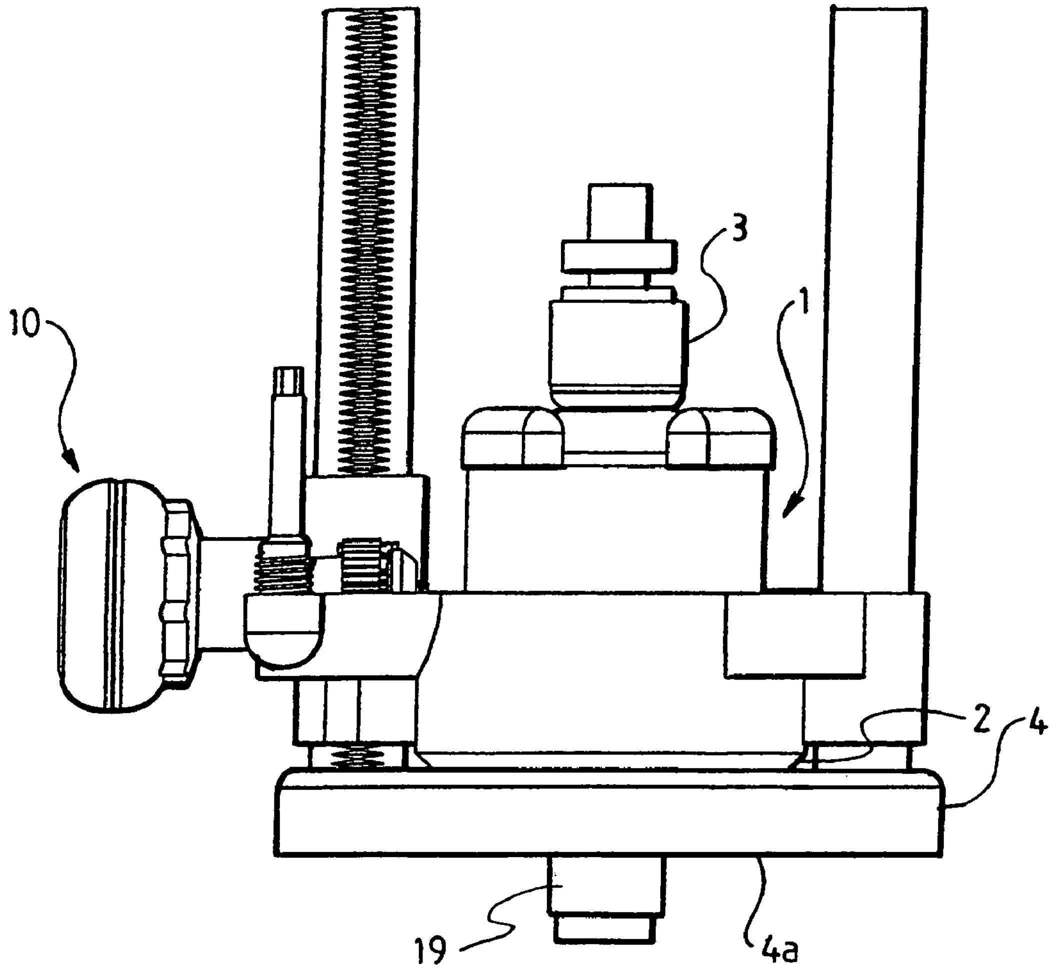
Figure 5:
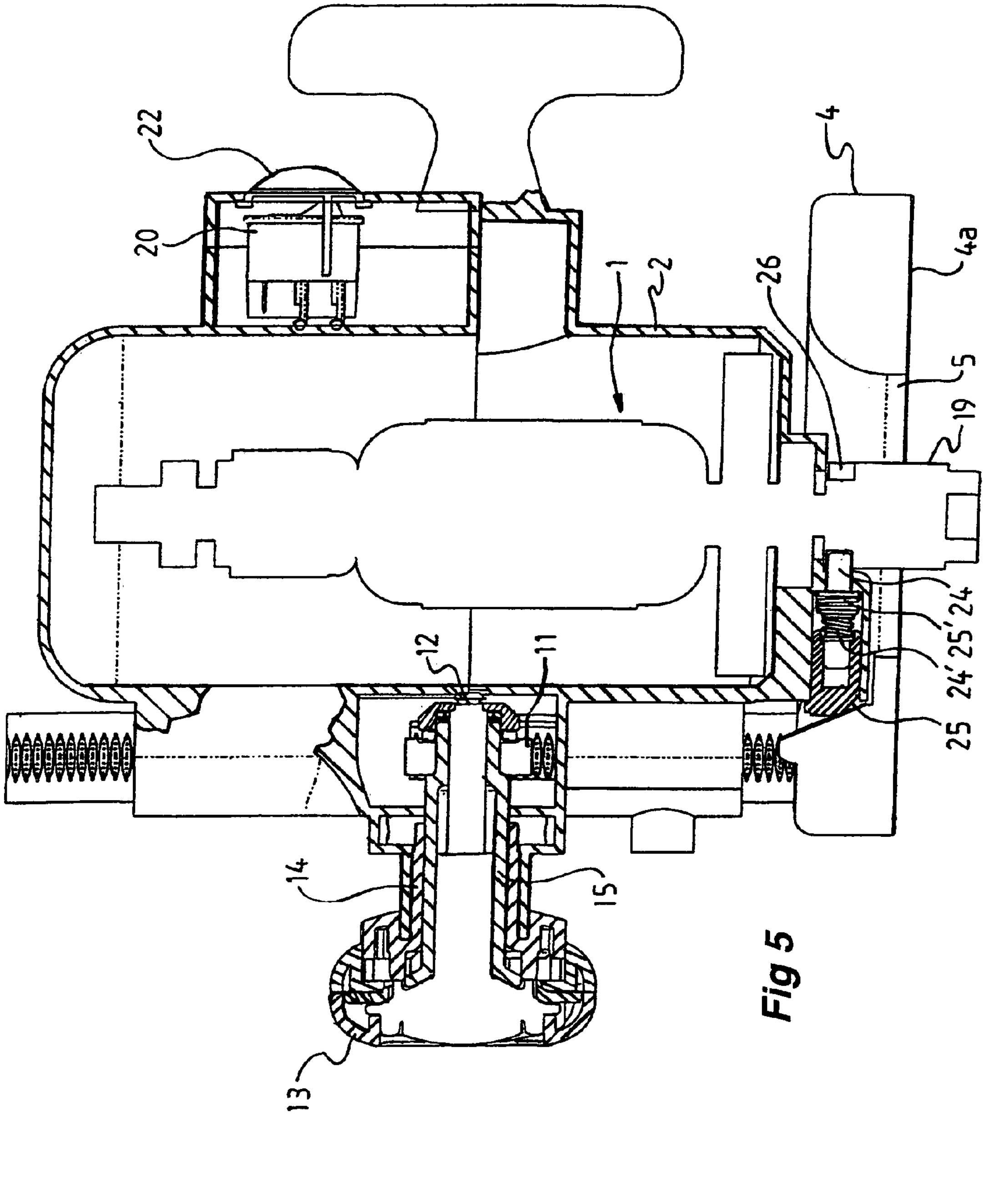
Figure 6:
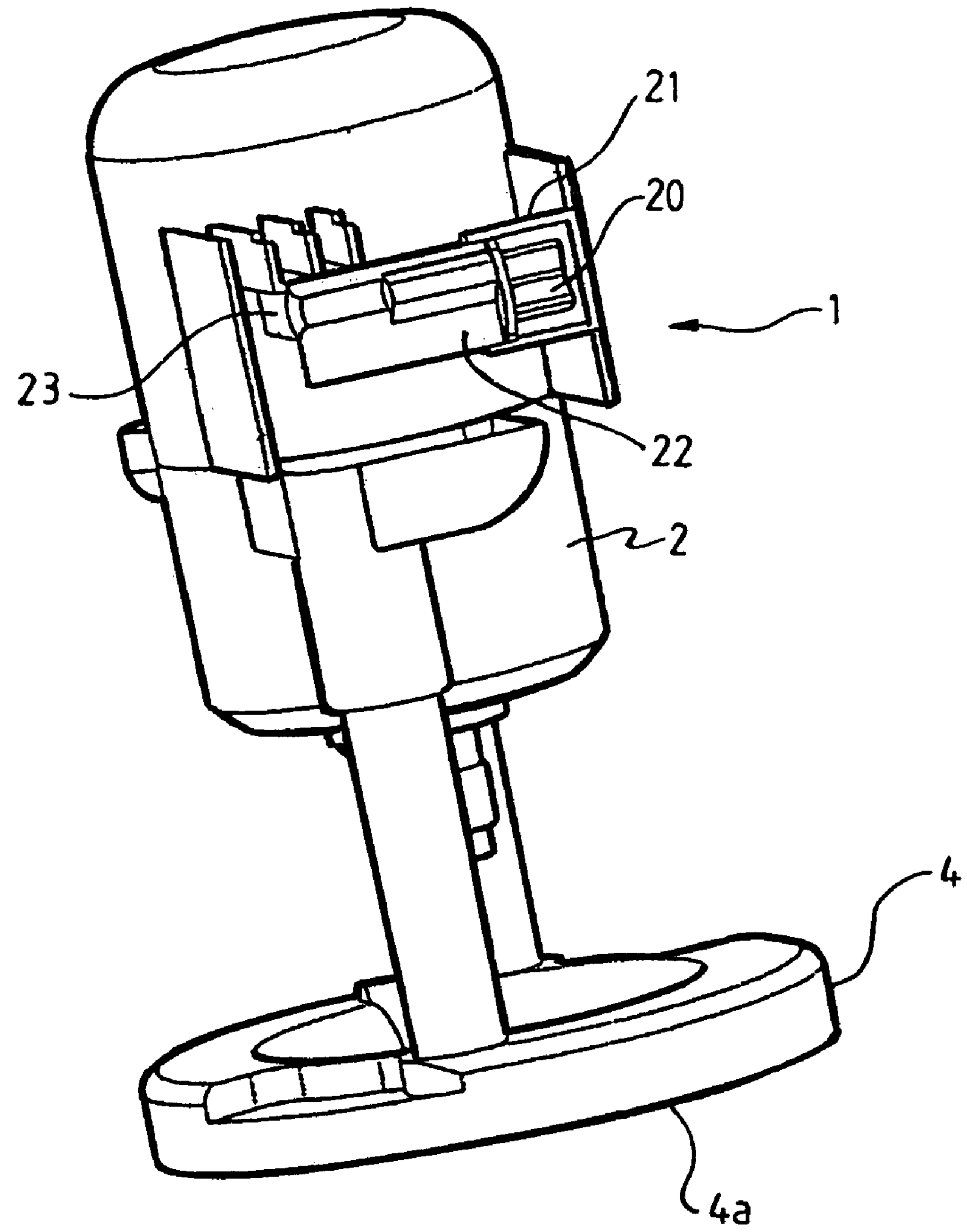

The features, objects and advantages of the present invention become more apparent from the following description of the preferred embodiment and accompanying drawings in which:

FIG. 1 is a perspective view of an embodiment of the invention with the rear of the housing removed, FIGS. 2, 3 and 4 are side elevational views of the embodiment of FIG. 1 illustrating the travel of the housing with respect to the base plate, FIG. 5 is a sectional view of the embodiment of FIG. 4 with the rear of the housing intact, and FIGS. 6–9 are perspective views of the embodiment of FIG. 1 illustrating the operation of the safety switch as the housing approaches the base plate.

Referring to the drawings, an electric power tool 1 in accordance with the invention, and embodied as a router, is shown to include a housing 2 having a motive power 3 therein. In FIG. 1 the rear of the housing 2 is removed to show the motive power 3 which is an electric motor 1 which may be powered by a portable power source such as a battery, or by mains power.

A base plate 4 is provided preferably having a flat base 4*a* so that the router can be stably supported against a work piece or a table. The base plate 4 is provided with an opening 5 for the passage of a cutting tool, which in the case of the embodiment shown in FIG. 1, is a router bit.

The position of the base plate 4 relative to the housing 2 is defined by guide arms or posts 6, 7 which are received within a fixture 8, 9 on the housing. The adjustment of the housing 2 relative to the base plate 4 is performed by a height adjustment mechanism 10 which preferably provides both coarse and fine adjustments.

The height adjustment is performed by a sprocket 11 which engages teeth 12 on one of the guide arms 6. As best seen in FIG. 5, the sprocket 11 rotates about an axle 12 which is engageable with a coarse adjustment knob 13. The coarse adjustment knob 13 is provided with a clutch mechanism which facilitates engagement between the sprocket 11 and the coarse adjustment knob 13.

The clutch mechanism, which is a slidable sleeve 14 fitting over and rotationally fixed relative to a mounting shaft 15 of the coarse adjustment knob which is engageable with the coarse adjustment knob by axial movement alone the mounting shaft 15. When the sleeve 15 engages with the coarse adjustment knob 13, the relative position of the mounting shaft 15 and the coarse adjustment knob is fixed until the sleeve is released, whereupon the sleeve returns to its original position under the action of a spring bias.

As the mounting shaft 15 is directly connected to the sprocket 11, rotation of the knob when the sleeve 14 is engaged, rotates the sprocket 11 causing the housing to progress up or down the guide arm 6.

A fine adjustment knob (not shown) may be provided which engages with teeth formed on the surface of mounting shaft 15. The fine adjustment knob is mounted on a substantially vertical shaft 16 (shown in FIG. 1) having a screw thread 17 which engages with the teeth 18 on the mounting shaft 15. Rotation of the fine adjustment knob and hence vertical shaft 16 causes small rotational movements of the mounting shaft and hence the sprocket 11. These movements are smaller than those caused by rotation of the coarse adjustment knob 10.

The motive power 3 is coupled to a tool holder 19 for a cutting tool. The cutting tool which preferably extends coaxially with the motive power 3 extends through opening 5 in base plate 4 to contact a work piece (not shown).

As illustrated in FIGS. 2–4, the adjustment mechanism allows the housing 2 to be progressed towards the base plate. As the working depth of the cutting tool in the tool holder 19 is defined by the extension of the cutting tool beyond the base plate 4, as shown in FIG. 4, the tool holder 19 extends through the base plate thereby maximising the cutting depth. Additionally, by having the tool holder extending through the opening 5 in the base plate 4, the tool embodying the invention is also able to provide greater access to the tool holder 19 for changing the cutting tool.

While having a tool holder 19 which is able to extend through the base plate 4 provides advantages over the prior art, the arrangement also introduces safety and operation risks if the motive power is still activated when the tool holder 19 extends beyond the base of the base plate 4.

Hence, it has been found to be advantageous to provide an arrangement which prevents the tool holder from extending the beyond the base plate while the motive power is activated. The operation of the safety mechanism of the invention is illustrated in FIGS. 6 to 9.

As the housing 2 is moved closer to the base plate 4, the guide arm 6 moves within and extends above its sleeve mounting 8. Fixture portions 9' are provided on housing 2 to define the limit of travel of the guide arm 6 along the side of housing 2 and are positioned to correspond to the position of the guide arms when the housing 2 is at its lowest position relative to the base plate 4.

Figure 9:
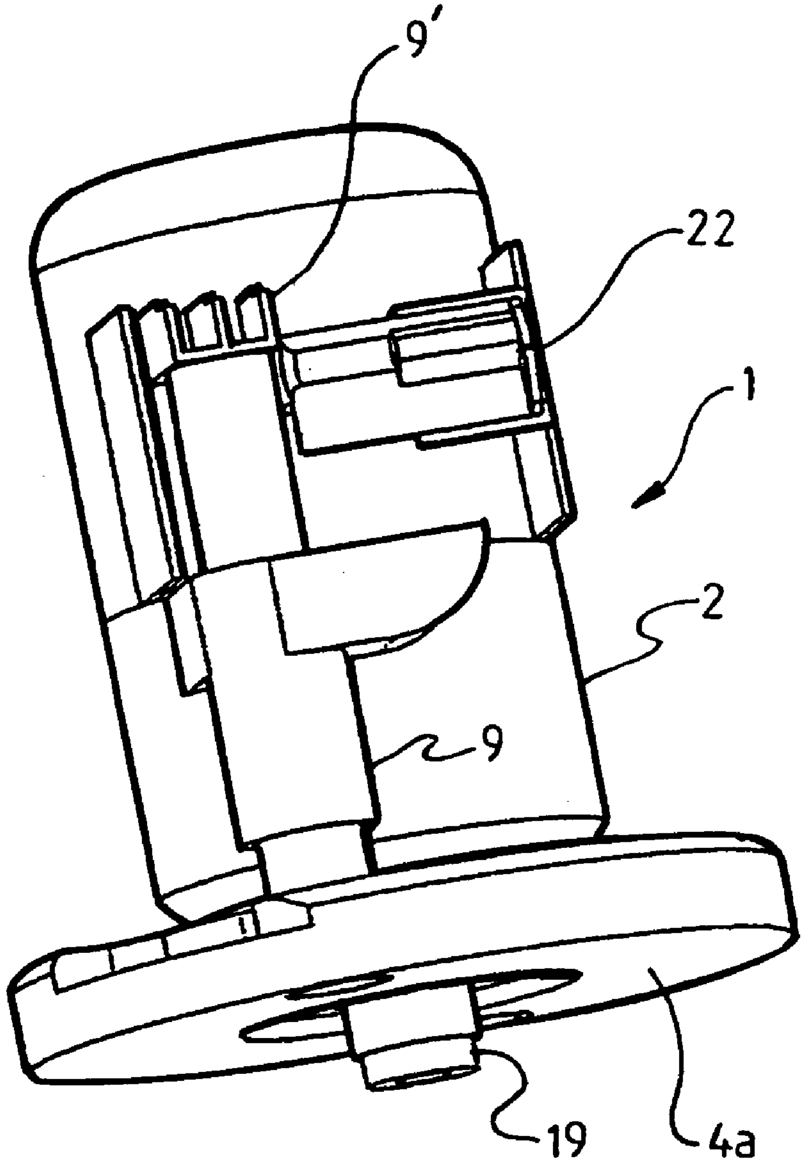

The safety mechanism includes an on/off switch 20 with a switch block 21. The switch block 21 is provided with grooves (not shown) to receive a switch plate 22 in sliding engagement. The switch plate 22 covers and prevents access to switch 20 only when the switch is in the off position (as shown in FIG. 9). The switch plate 22 moves between a position which covers the switch 20 and one which allows access to the switch. Switch plate 22 is further provided with a stop 23 which extends between the switch plate 22 and housing 2. When the switch plate is not covering switch 20, stop 23 extends across the path of guide arm 6 as the housing is moved towards the base plate. When the switch plate 22 is in this position, the switch 20 can be either on or off corresponding to the motive power being activated or deactivated respectively.

Figure 7:
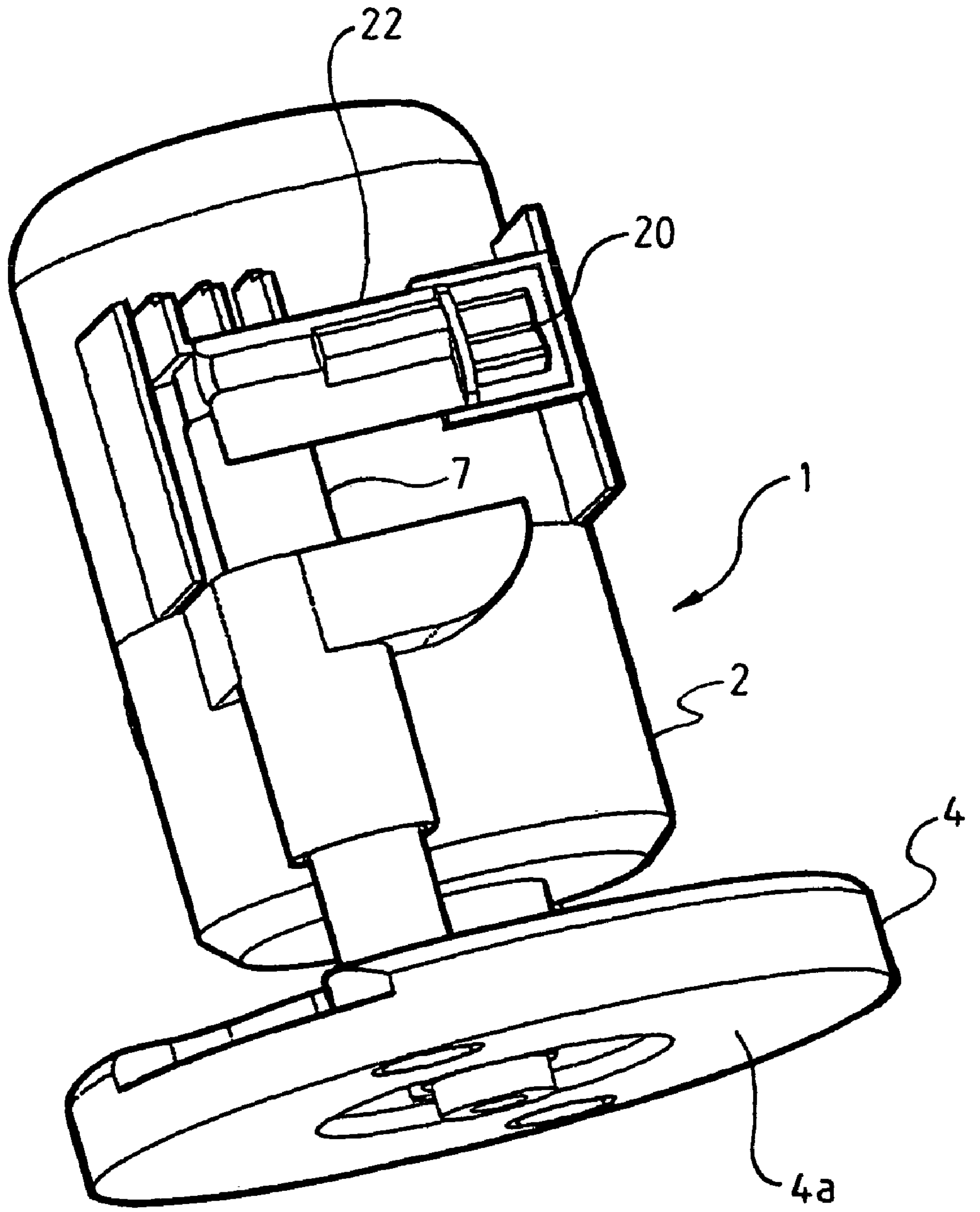
Figure 8:
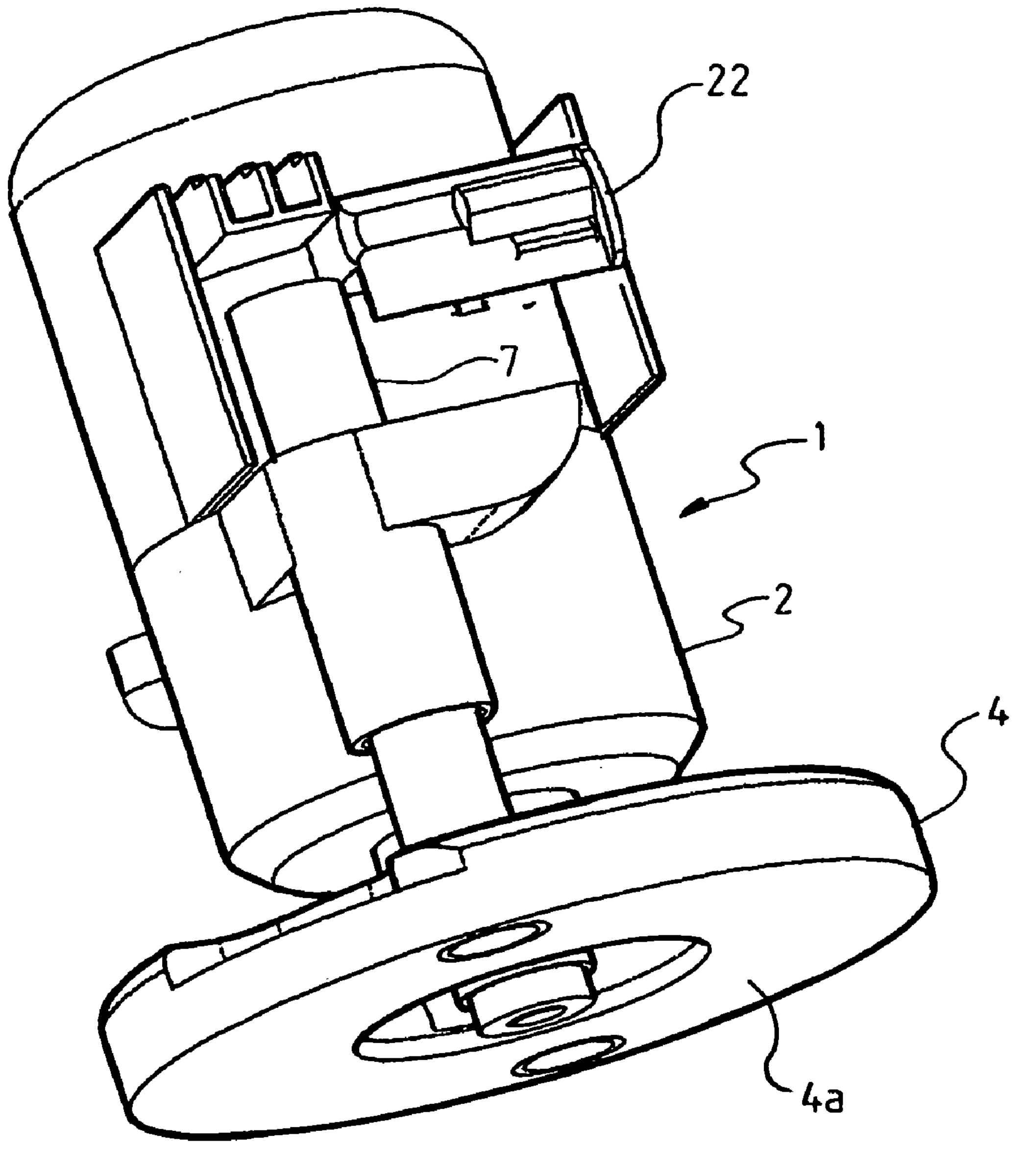

While the switch plate is not covering switch 20, it is not possible for guide arms 6 to travel to their limit of travel. Hence, housing 2 is restricted from descending to its lowermost position relative to base plate 4. By selectively designing the position of the fixture portions 9' and the length of guide arms 6, the tool holder 19 can be prevented from extending through the base plate 4 without the switch being deactivated as shown in FIG. 7.

Once the switch 20 to motive power 3 is switched off, switch cover 22 is spring loaded to cover the switch. Movement of the switch cover removes the stop 23 from the path of the guide arm 6 allowing housing 2 to be moved closer to the base plate (FIG. 9).

With switch cover 22 covering the switch 20, the motive power 3 is prevented from being activated.

Another difficulty with the routers currently on the market is the access to the tool holder 19 during tool changing operations. While a tool holder 19 which extends through the base plate provides easier access to the engagement mechanism of the tool holder, the changing operation is nevertheless a two-handed process. By immobilising the tool holder 19 when it extends through the base plate 4, the tool changing operation can become a single-handed operation from above the router table.

Referring to FIG. 5, an embodiment of the router in accordance with the second aspect of the invention is shown. The tool holder 19 extends through opening 5 in the base plate 4 and engages with a releasable latching mechanism. The latching mechanism comprises a plunger having a driven pin 25 with a driven end in the form of an inclined face, a slave pin 24 having a locking end for engagement with a recess 26 in the tool holder 19 and two springs, all contained within the lower housing 2. As the router is fully plunged, the driven end of the driven pin 25 engages the inclined face inside the base 4 and pushes the slave pin 24 forward by means of an engagement spring 24' between an inner face of the driven pin 25 and an annular fin around the mid point of slave pin 24. There is a second, weaker retraction spring 25' on the other side of the annular fin on slave pin 24 which is used to return the mechanism when the router is raised to disengage the inclined faces of 4 and 25.

To operate the latching mechanism, the housing 2 is positioned in its lowermost position relative to the base plate 4. In this position, the tool holder 19 extends through the base plate 4, and the positioning of the housing 2 activates the latching mechanism releasing latch pin 24 which is forced towards the tool holder 19 under the action of a spring bias. The tool holder 19 may then be rotated manually until the slave pin 24 locates within the recess 26 in the tool holder 19. Once the slave pin 24 engages with the tool holder 19, the tool holder 19 is effectively immobilized until the latching mechanism is disengaged. In this position, the tool holder 19 which may be a keyed or keyless collet, may be loosened and/or tightened as a single-handed operation to facilitate changing of the cutting tool (not shown) in the tool holder 19.

To disengage the latching mechanism, the router is raised, removing the inclined face on the base 4 from contact with the inclined face on driven pin 25, the slave pin 24 is then free to be retracted by the weaker inner spring (not shown) between the annular fin around the slave pin 24 and the housing 2.

It will be appreciated from the above description that the switch cover 22 prevents the motive power 3 being activated which the latching mechanism is activated thereby prevent damage to the tool. Similarly, the latching mechanism can not be activated while the switch is on since the pin 24 is unable to engage the recess 26 as described above.

What is claimed is:

1. An electric power tool including:

a housing having a motive power therein, a tool holder coupled to said motive power for receiving a cutting tool and rotating said cutting tool about a longitudinal axis, a base plate having an opening through which said cutting tool extends to engage a work piece, said base plate being adjustably mounted to said housing by guide arms, extension of said cutting tool being varied by adjusting the position of said base plate relative to said housing, said tool holder being able to extend through the opening in said base plate to provide better access to the tool holder, an on/off switch for energising said motive power, and a slidable cover movable from a switch-covering position to a non switch-covering position, whereby said motive power cannot be accidentally energised when said cover is in said switch-covering position and wherein said cover includes a safety stop which limits said extension of at least one of the guide arms when said cover is in said non switch-covering position.

2. An electric power tool including:

a housing having a motive power therein;

a tool holder coupled to said motive power for receiving a cutting tool and rotating said cutting tool about a longitudinal axis;

a base plate having an opening through which said cutting tool extends to engage a work piece in operation and to facilitate access to said tool holder for tool removal and installation, said base plate being adjustably mounted to said housing by guide arms, the extension of said cutting tool being varied by adjusting the position of said base plate relative to said housing; and a locking member supported by said housing and driveable between an unlocked position and a locked position in which said tool holder is immobilised allowing release of said tool therefrom in a single-handed operation, said locking member operably interposed between said base and said tool holder, wherein said locking member is driven to said locked position by extension of said tool holder through said opening in said base plate.

3. An electric power tool as claimed in claim 2 wherein said locking member comprises a plunger orientated transversely with respect to said longitudinal axis.

4. An electric power tool as claimed in claim 3 wherein said plunger comprises a driven end and a locking end, said locking end engaging a recess formed in said tool holder when said driven end is driven transversely towards said tool holder by sliding engagement with a ramp on said base plate during extension of said tool holder through said opening in said base plate.

5. An electric power tool as claimed in claim 4 wherein said driven end and said locking end of said plunger are biased away from each other by a spring means, said spring means allowing said driven end to be driven towards said tool holder before said recess and said locking end are aligned.

6. An electric power tool as claimed in claim 4 wherein said plunger includes:

a driven pin;

a slave pin;

a retraction spring for retracting said plunger, said retraction spring mounted between said slave pin and said housing; and an engagement spring for biasing said slave pin and said locking end towards said recess in said tool holder, wherein said engagement spring allows said driven end to be driven towards said tool holder before said recess and said locking end are aligned.

7. An electrical power tool as claimed in claim 2 including a mechanical interlock to prevent driving of said locking member to said locked position when said motive power is energised.

8. An electric power tool as claimed in claim 7 wherein said mechanical interlock includes an on/off switch.

9. An electric power tool according to claim 8 including a slidable cover movable from a switch-covering position to a non switch-covering position, whereby said motive power cannot be accidentally energised when said cover is in said switch-covering position.

10. An electric power tool as claimed in claim 9 wherein said cover includes a safety stop which limits said extension of said tool holder through said opening on said base plate when said cover is in said non switch-covering position, thereby preventing said locking member being driven to said locked position.

11. An electric power tool including:

a housing having a motive power therein;

a tool holder coupled to said motive power for receiving a cutting tool and rotating said cutting tool about a longitudinal axis;

a base plate having an opening through which said cutting tool extends to engage a work piece in operation and to facilitate access to said tool holder for tool removal and installation, said base plate being adjustably mounted to said housing, the extension of said cutting tool being varied by adjusting the position of said base plate relative to said housing; and a locking member supported by said housing and driveable between an unlocked position and a locked position in which said tool holder is immobilised allowing release of said tool therefrom in a single-handed operation, said locking member operably interposed between said base and said tool holder, wherein said locking member is driven to said locked position by extension of said tool holder through said opening in said base plate.

12. An electric power tool as claimed in claim 11 wherein said locking member comprises a plunger orientated transversely with respect to said longitudinal axis.

13. An electric power tool as claimed in claim 12 wherein said plunger comprises a driven end and a locking end, said locking end engaging a recess formed in said tool holder when said driven end is driven transversely towards said tool holder by sliding engagement with a ramp on said base plate during extension of said tool holder through said opening in said base plate.

14. An electric power tool as claimed in claim 13 wherein said driven end and said locking end of said plunger are biased away from each other by a spring means, said spring means allowing said driven end to be driven towards said tool holder before said recess and said locking end are aligned.

15. An electric power tool as claimed in claim 13 wherein said plunger includes:

a driven pin;

a slave pin;

a retraction spring for retracting said plunger, said retraction spring mounted between said slave pin and said housing; and an engagement spring for biasing said slave pin and said locking end towards said recess in said tool holder, wherein said engagement spring allows said driven end to be driven towards said tool holder before said recess and said locking end are aligned.

16. An electrical power tool as claimed in claim 11 including a mechanical interlock to prevent driving of said locking member to said locked position when said motive power is energised.

17. An electric power tool as claimed in claim 16 wherein said mechanical interlock includes an on/off switch.

18. An electric power tool according to claim 17 including a slidable cover movable from a switch-covering position to a non switch-covering position, whereby said motive power cannot be accidentally energised when said cover is in said switch-covering position.

19. An electric power tool as claimed in claim 18 wherein said cover includes a safety stop which limits said extension of said tool holder through said opening on said base plate when said cover is in said non switch-covering position, thereby preventing said locking member being driven to said locked position.

* * * * *